(12) United States Patent
Okubo et al.

(10) Patent No.: US 10,728,273 B1
(45) Date of Patent: Jul. 28, 2020

(54) SYSTEMS, DEVICES, AND METHODS FOR DETECTING AND MITIGATING DOMAIN NAME REGISTRATIONS USED FOR MALICIOUS BEHAVIOR

(71) Applicant: VERISIGN, INC., Reston, VA (US)

(72) Inventors: Tomofumi Okubo, Arlington, VA (US); Eric Osterweil, Fairfax, VA (US); Matthew Thomas, Atlanta, GA (US)

(73) Assignee: VERISIGN, INC., Reston, VA (US)

( * ) Notice: Subject to any disclaimer, the term of this patent is extended or adjusted under 35 U.S.C. 154(b) by 156 days.

(21) Appl. No.: 15/664,545

(22) Filed: Jul. 31, 2017

(51) Int. Cl.
| | |
|---|---|
| *G06F 21/00* | (2013.01) |
| *G06F 21/55* | (2013.01) |
| *G06F 21/56* | (2013.01) |
| *H04L 29/06* | (2006.01) |
| *G06F 7/20* | (2006.01) |
| *H04L 29/12* | (2006.01) |
| *G06F 16/951* | (2019.01) |

(52) U.S. Cl.
CPC .......... *H04L 63/1433* (2013.01); *G06F 7/20* (2013.01); *G06F 16/951* (2019.01); *G06F 21/00* (2013.01); *H04L 61/1511* (2013.01); *H04L 61/3015* (2013.01); *H04L 63/1416* (2013.01)

(58) Field of Classification Search
CPC .......... H04L 63/1416; H04L 63/1425; H04L 63/1433; H04L 63/1441; H04L 63/1408; H04L 61/1511; H04L 61/3015; G06F 16/951; G06F 7/20; G06F 21/00; G06F 21/55; G06F 21/56
See application file for complete search history.

(56) References Cited

U.S. PATENT DOCUMENTS

| | | | | |
|---|---|---|---|---|
| 9,363,282 | B1 * | 6/2016 | Yu | .................. H04L 63/1425 |
| 9,635,049 | B1 * | 4/2017 | Oprea | ................. H04L 63/145 |
| 2007/0299967 | A1 * | 12/2007 | Brady | ................. G06Q 30/00 |
| | | | | 709/224 |
| 2014/0298461 | A1 * | 10/2014 | Hohndel | ............ H04L 63/1416 |
| | | | | 726/23 |
| 2017/0295187 | A1 * | 10/2017 | Havelka | ............. H04L 63/1441 |

\* cited by examiner

*Primary Examiner* — Alexander Lagor
*Assistant Examiner* — Howard H. Louie
(74) *Attorney, Agent, or Firm* — MH2 Technology Law Group, LLP

(57) ABSTRACT

A method for detecting a domain name that is associated with malicious behavior includes receiving domain data for a plurality of domain names including a first domain name and a plurality of similar domain names. The domain data includes a first attribute and a second attribute of the first domain name and the similar domain names. The first attribute of the first domain name is compared to the first attributes of the similar domain names to produce a first value. The second attribute of the first domain name is compared to the second attributes of the similar domain names to produce a second value. The first value and the second value are combined to produce a combined value. A likelihood that the first domain name is associated with malicious behavior is determined based on the combined value.

15 Claims, 4 Drawing Sheets

SYSTEMS, DEVICES, AND METHODS FOR DETECTING AND MITIGATING DOMAIN NAME REGISTRATIONS USED FOR MALICIOUS BEHAVIOR

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, can be delegated to a particular organization, known as a domain name registry ("registry"). The registry is primarily responsible for answering queries for IP addresses associated with domains ("resolving"), typically through DNS servers that maintain such information in large databases, and operating its top-level domain.

In some instances, in order to obtain a domain name, that domain name is registered with a registry through a domain name registrar, an entity accredited by the Internet Corporation for Assigned Names and Numbers (ICANN) and authorized to register Internet domain names on behalf of end-users. Generally, when a domain name is registered, domain data is stored in a database that can be queried.

Domain names are registered for a wide variety of purposes. For example, domain names can be registered for legitimate uses, such as for providing services, providing information, branding, defensive registrations, and the like. Additionally, domain names can be registered to engage in malicious behavior. For example, malicious behavior may include Denial-of-Service (DoS) attacks (e.g., Distributed Denial-of-Service (DDoS) attacks), botnets (and command and control infrastructure), phishing, spam, or the like. In a DoS attack, for example, one or more requestors flood a server with an undesirably large amount of query traffic and/or abnormally complex queries. Processing these requests requires an abnormally large amount of resources and thus degrades and slows a server's ability to service legitimate requests. Accordingly, improved systems, devices, and methods for detecting domain name registrations that are registered to engage in malicious behavior and subsequently mitigating this behavior, based on the domain data, would be desirable.

SUMMARY

Systems and methods for detecting a domain name that is associated with malicious behavior are disclosed. The method includes receiving domain data for a plurality of domain names including a first domain name and a plurality of similar domain names. The domain data includes a first attribute and a second attribute of the first domain name and the similar domain names. The first attribute of the first domain name is compared to the first attributes of the similar domain names to produce a first value. The second attribute of the first domain name is compared to the second attributes of the similar domain names to produce a second value. The first value and the second value are combined to produce a combined value. A likelihood that the first domain name is associated with malicious behavior is determined based on the combined value.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
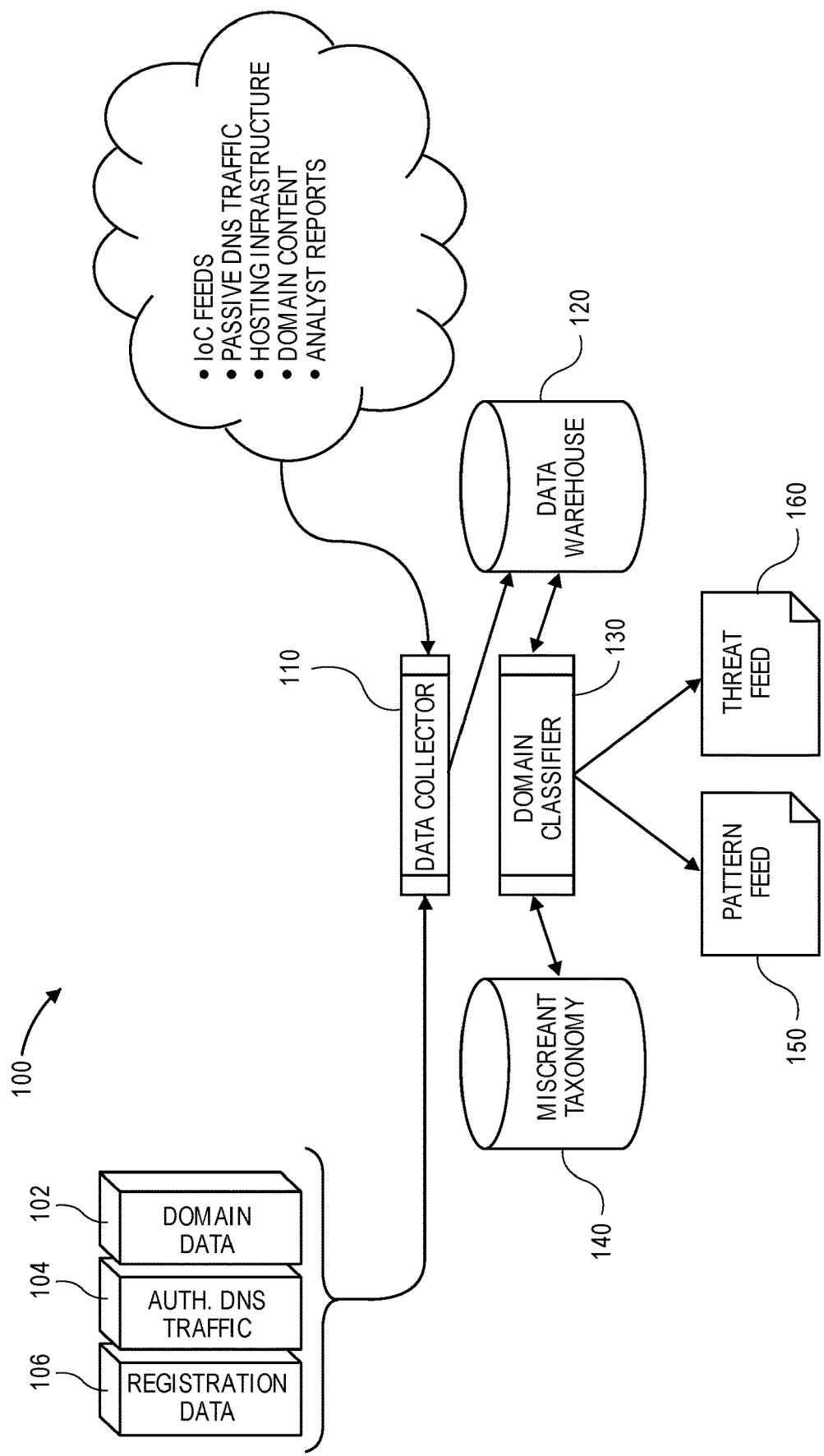
FIG. 1 is a diagram illustrating an example of a system for detecting and mitigating domain names that are associated with malicious behavior, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Domain names can be registered to engage in malicious behavior, such as DOS attacks. The systems and methods disclosed herein may determine a likelihood that a domain name is registered to engage in malicious behavior by analyzing domain data describing, or related to, the domain name. When the likelihood is greater than a threshold, the systems and methods disclosed herein may initiate mitigating or remedial action that may provide a technical or network solution to alleviate or prevent the malicious behavior.

FIG. 1 is a diagram illustrating an example of a system 100 for detecting and mitigating domain names that are associated with malicious behavior, consistent with certain disclosed embodiments. The system 100 may include a data collector 110, a data warehouse 120, and a domain classifier 130, which are communicably connected to each other, for example, via a network (not shown), such as the Internet. The data collector 110 may be configured to receive domain data 102, authorized DNS traffic 104, registration data 106, and the like from sources such as an authoritative DNS, a domain registration/management system, a registry, other services, or third parties. As used herein, domain data refers to attributes describing one or more domain names. More particularly, the domain data may include an analysis or excerpts of the domain's website, its WHOIS information, or general DNS records. In one example, the domain data may include email contacts, geolocation of servers, services offered and sold, technologies and infrastructure used, and the like. In another example, the domain data may include uses of a domain name, registration patterns of a domain name, query patterns of a domain name, reputation scores of a domain name, pricing data of a domain name, and the like. As used herein, authorized DNS traffic refers to DNS traffic resolution requests for a domain name. This may come from various levels with the DNS hierarchy (e.g., the root or TLD servers). As used herein, registration data refers to the operations (including historical) for a domain name such as create, modify, or delete operations performed by a registrar on behalf of the registrant. For example, the registration data may include the registration date, the registrant, the registrar, the WHOIS information, the website hosting provider, the IP address, the port number, or a combination thereof. The data collector 110 may also be configured to receive IoC feeds, passive DNS traffic, hosting infrastructure, domain content, and analyst reports.

The data warehouse 120 may receive and store the data from the data collector 110. The domain classifier 130 may classify the data in the data warehouse 120. More particularly, the domain classifier 130 may determine input values by comparing the input values to the normalized distribution of other domain values and return a statistical value as a +/− standard deviation from the mean. The domain classifier 130 may use the data stores and meta information to perform its classification. The domain classifier 130 may interact with a miscreant taxonomy 140, a pattern feed 150, and a threat feed 160.

Figure 2:
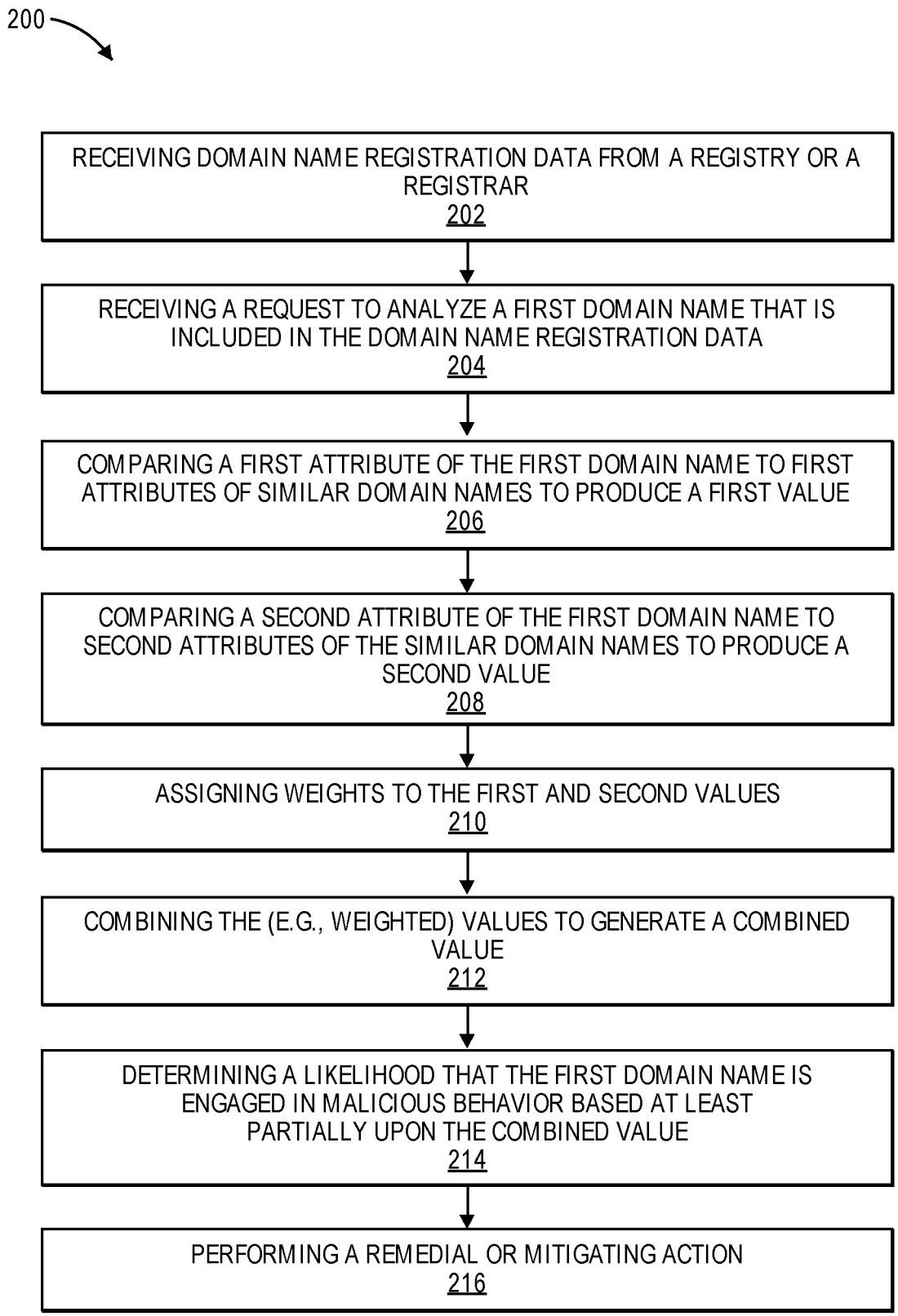
FIG. 2 is a diagram illustrating an example of a method for detecting and mitigating domain names that are associated with malicious behavior, consistent with certain disclosed embodiments.

FIG. 2 is a diagram illustrating an example of a method 200 for detecting and mitigating domain names that are associated with malicious behavior, consistent with certain disclosed embodiments. Some or all of the method 200 may be performed by the system 100. The method 200 may include receiving domain data from a registry or a registrar, as at 202. As discussed above, the domain data may be or include attributes describing one or more domain names. The attributes may be or include:

indication of use(s) of a first domain name and/or similar domain names (i.e., domain names similar to the first domain name);
registrations patterns of the first domain name and/or the similar domain names;
query patterns of the first domain name and/or the similar domain names;
reputation scores of the first domain name and/or the similar domain names;
pricing data corresponding to prices at which the first domain name and/or the similar domain names are registered. The prices may be or include historical pricing, sales, promotions, registrar prices, registry prices, etc.;
indicators of compromise (IoC) feeds corresponding to spam (i.e., data that would suggest some form of malware software as infiltrated the security perimeter), command and control (C2), phishing, and the like;
current and historical traffic volume and diversity of the first domain name and/or the similar domain names;
Extensible Provisioning Protocol ("EPP") transactions of the first domain name and/or the similar domain names;
geo-locations of registration lookups of the first domain name and/or the similar domain names;
time in which the first domain name and/or the similar domain names are in use or are idle;
or a combination thereof.

As used herein, the first domain name may be the domain name to be analyzed (e.g., to determine its likelihood of engaging in malicious behavior). As used herein, similar domain names refers to domain names that share similar linguistic or structural patterns with the first domain name. In at least one embodiment, the similar domain names are previously known to be used for engaging in proper (i.e., not malicious) behavior. Thus, the similar domain names may be used as a control group for comparison with the first domain name. When the attribute is price, the price may be different at the registry and the registrar. The registrar is selling the domain name on behalf of the registry. For example, the registrar charges a customer a first amount but pays a second amount to the registry.

The method 200 may also include receiving a request to analyze the first domain name, as at 204. As mentioned above, the domain data may include information about the first domain name.

The method 200 may also include comparing a first attribute of the first domain name to corresponding first attributes of the similar domain names to produce a first value, as at 206. The first attribute may be one of the attributes listed at 202 above. The comparison may include determining a predetermined (e.g., normal) range/distribution of the first attribute based upon the similar domain names. The predetermined range/distribution may be determined using historical data to build a baseline range/distribution to measure future evaluations against. The future evaluations may then be put back into the original baseline to update it. After the predetermined range/distribution is determined, the first attribute of the first domain name is compared to the predetermined range/distribution. The first value may identify how many standard deviations the first attribute of the first domain name is in relation to the predetermined range/distribution. As described in greater detail below, when the first attribute of the first domain name deviates from the predetermined range/distribution (e.g., less than the lower end of the predetermined range) by a predetermined amount, this may be an indication that the first domain name is associated with malicious behavior. In at least one embodiment, determining whether the first attribute of the first domain name is outside the predetermined range may include determining whether first attributes of a plurality of domain names are outside the predetermined range within a predetermined time period (e.g., in rapid succession). The predetermined time period may be, for example, less than about 60 seconds.

The method 200 may also include comparing a second attribute of the first domain name to corresponding second attributes of the similar domain names to produce a second value, as at 208. The second attribute may be or include one or more of the attributes listed at 202 above. In at least one embodiment, the comparison at 208 may only occur when the first attribute of the first domain name deviates from the predetermined range/distribution by a predetermined amount. The comparison at 208 may include determining a predetermined (e.g., normal) range/distribution of the second attribute based upon the similar domain names, and then comparing the second attribute of the first domain name to the predetermined range/distribution. The second value may identify how many standard deviations the second attribute of the first domain name is in relation to the predetermined range/distribution. When the second attribute of the first domain name is outside the predetermined range/distribution by a predetermined amount, this may increase the likelihood/confidence that the first domain name is associated with malicious behavior. The method 200 may also include comparing a third, fourth, etc. attribute of the first domain name to corresponding third, fourth, etc. attributes of the similar domain names to further increase the likelihood/confidence that the first domain name is associated with malicious behavior. The comparisons of the first, second, third, fourth, etc. attributes may be used to create a high dimension (e.g., many different measurements) vector to be used in a classification/regression.

The method 200 may also include assigning weights to the first and second values generated at 206 and/or 208 above, as at 210. The weights may be assigned manually. In another embodiment, the weights may be based upon historical data distributions and classification of malicious vs. benign behavior, and a regression model may be fitted thereto.

The method 200 may also include combining the values (e.g., weighted values) to generate a combined value, as at 212. In some embodiments, a higher weight makes a particular value contribute more to the combined value, and a lower weight makes a particular value contribute less to the combined value. For example, weights for the first and second values may have a ratio of 2:1, making the first value contribute twice as much to the combined value as the second value. In at least one embodiment, the weights may be omitted.

In one example, one of the first value or the second value may include or be based on pricing data, and, accordingly, the combined value may be based on the pricing data. In at least one embodiment, combining the values may include performing a regression using the first value, the second value, etc. The regression may be or include a logistic and/or linear regression. An illustrative regression is described below with respect to FIG. 3.

The method 200 may also include determining a likelihood that the first domain name is associated with malicious behavior based at least partially upon the combined value, as at 214. This determination may include comparing the combined value to values known to be associated with malicious domains and/or benign domains.

In response to the likelihood that the first domain name is associated with malicious behavior, the method 200 may also include performing a remedial or mitigating action, as at 216. For example, when the likelihood is greater than or equal to a predetermined value (e.g., 50%), the remedial or mitigation action may be performed. The remedial or mitigating action may include ceasing to process requests from the first domain name and instead responding with an error message in an alternative response. In another embodiment, the remedial or mitigating action may include sending an alert to a network operations controller that instigates reconfiguration of network hardware to block access to one or more servers (e.g., the system 100) from the first domain name. In another embodiment, the remedial or mitigating action may include performing mitigating functions against the first domain name, such as setting up or reconfiguring router or firewall rules to block requests from the first domain name from reaching one or more servers (e.g., the system 100). In another embodiment, the remedial or mitigating action may include generating future price suggestions. In another embodiment, the remedial or mitigating action may include generating a threat feed. In another embodiment, the remedial or mitigating action may include notifying a resolving client that its resolution is citing to a domain name that may be associated with malicious behavior. In another embodiment, the remedial or mitigating action may include disrupting resolution to the first domain name (e.g., instead of resolving the domain). Thus, as will be appreciated, the method 200 may provide improvements to a technology or technical field, namely detection and mitigation of domain names being used for malicious purposes.

Figure 3:
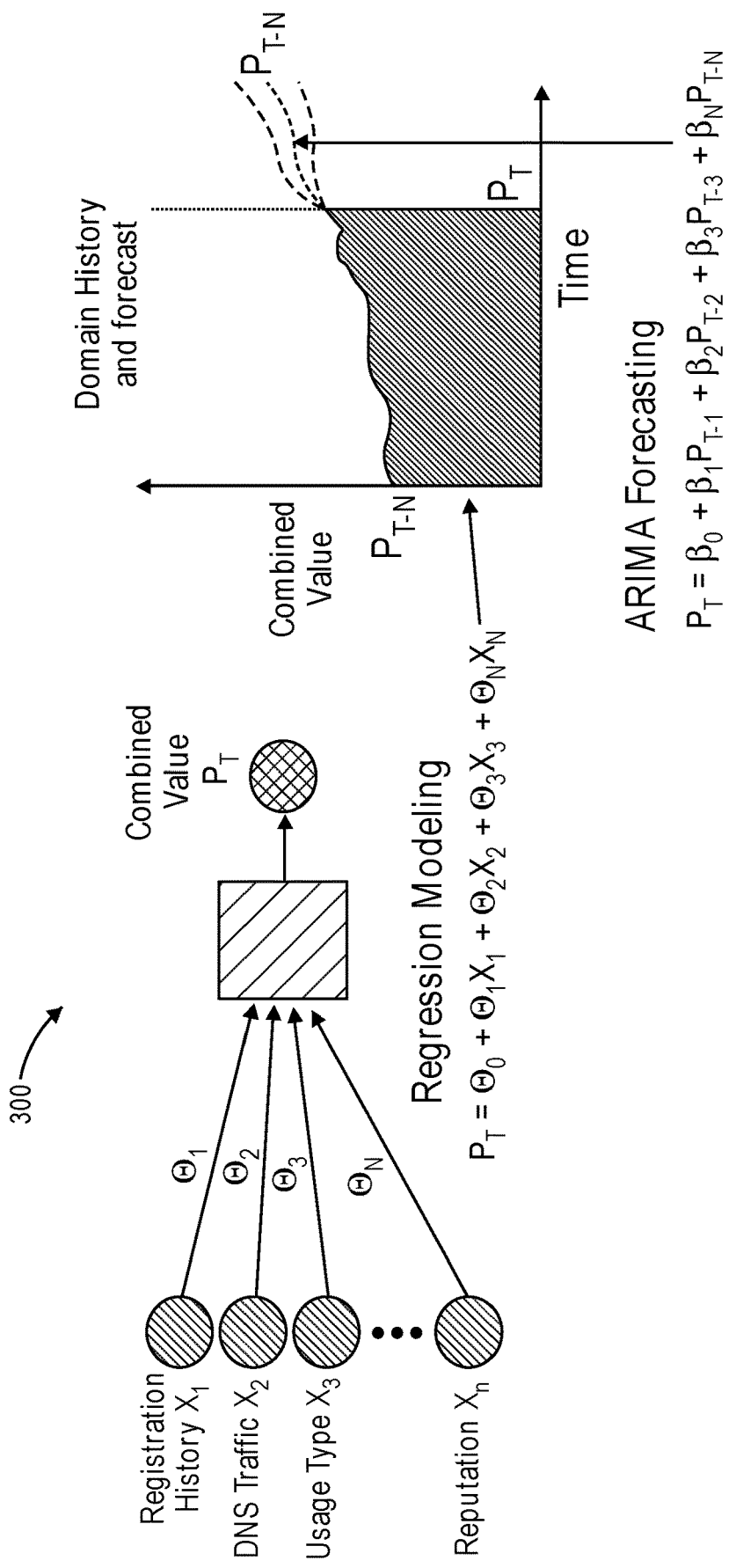
FIG. 3 is a diagram illustrating an example of a portion of the method of FIG. 2, consistent with certain disclosed embodiments.

FIG. 3 is a diagram 300 illustrating an example of a portion of the method 200 of FIG. 2, consistent with certain disclosed embodiments. In this example, four attributes are compared (e.g., in stages 206, 208 above). The first attribute ($X_1$) is the registration history, the second attribute ($X_2$) is the DNS traffic, the third attribute ($X_3$) is the usage type, and the fourth attribute ($X_N$) is the reputation. As will be appreciated, any number of attributes may be used, and the number is not limited to four. The symbols $\Theta_1$, $\Theta_2$, $\Theta_3$, and ON represent the weights.

The logistic and/or linear regression model may be applied to the weighted values. For example, the combined value ($P_T$) may be determined as follows:

$$P_T = \Theta_0 + \Theta_1 X_1 + \Theta_2 X_2 + \Theta_3 X_3 + \Theta_N X_N \quad (1)$$

In one embodiment, the combined value $P_T$ may be a domain data attribute, such as a reputation score or a price. $P_T$ may be a unitless value that is the output of the weighted regression model. In response to the model, a forecast of the combined value may be generated. The forecast may be an autoregressive integrated moving average ("ARIMA") forecast. For example, $$P_T = \beta_0 + \beta_1 P_{T-1} + \beta_2 P_{T-2} + \beta_3 P_{T-3} + \beta_N P_{T-N} \quad (2)$$

The forecast may be used to generate/predict future values for domain names, as discussed above. P values may change over time as additional telemetry/measurements are received for the domains. $P_{T-N}$ are measurements of the domain calculated at a specific point in time (T), going back N units (e.g., hours, days, weeks). B represents ARIMA parameters.

As a further example, one or more of the attributes of a domain name can be price at which the domain name was sold by a registrar. Domain names that are registered for prices that are greater than a certain threshold are oftentimes used for branding, defensive registrations, or the primary business property. However, domain names that are registered for prices that are below the threshold (i.e., cheap domain names) are more likely to be used for malicious purposes. Accordingly, the combined value that is calculated based on the price can be a strong indicator of whether the domain name is used for malicious purposes.

In at least one embodiment, the systems and methods disclosed herein may be used to forecast the expected prices of domain names using a variety of factors such as registration patterns, registration history, domain name system ("DNS") traffic, domain usage or usage type, reputation score, and the like. The systems and methods disclosed herein may be used for protective purposes and/or usage purposes. The protective purposes may include detecting aberrant registration patterns, determining a correlation between domain price and domain usage type, determining a reputation score of a domain based on the price of the registration, and determining the correlation between the registrar that registered the domain name, the price at which the domain name was sold, the usage of the domain name, and mitigating against domain names registered for malicious purposes. The usage purposes may include proactive registration of domains based on price, domain registration based on top-level domain ("TLD") reputation, optimizing domain registrations for less than fixed value, registration timing based on forecasting of domain price, and geo-spatial registration optimization.

Protection: Detecting Aberrant Registration Patterns

Daily domain registrations at a registry and/or registrar level may follow a predictable pattern given a set of control attributes (e.g., price or reputation score). Time-series analysis techniques such as Holt Winters or ARIMA may be used to detect unexpected dips or increases in domain registrations when the underlying control attribute (e.g., price or reputation score) is altered. Identified abnormalities may indicate malicious registrations or unforeseen pricing shifts within the registry channel.

Protection: Determining a Correlation Between Domain Attribute and Domain Usage Type Domains may have a myriad of uses. However, many of these uses are driven by attributes of the domain. For example, domains sold at a lower price may be used for malicious purposes or pay-per-click ("PPC")-monetization, while domains sold at a higher price may be used for branding, defensive registrations, or primary business property. By correlating domain attributes with the domain's usage type, future domain registration usage may be modeled based on attribute value shifts and the intended usage types of the domains being registered can be determined.

Protection: Determining a Reputation of a Domain Based on the Price of the Registration Incorporating domain name attributes into reputation systems may be used to identify whether the domain name is, for example, reliable, safe, stabile, etc. For example, an acquisition/renewal price of a domain name can influence whether a domain name is considered reliable or malicious. Domains sold at a lower price may be used for maleficence, while domains sold at a higher price may not be.

Protection: Determining a Correlation between the Registrar, the Attribute, and the Usage Domain name health scoring, reputation scoring, threat analyses, and the like may include the fusion of many attributes, such as the services offered and price. Analysis of the relative price of a domain (e.g., vs. others sold), the choice of registrar, and the usage pattern may be used together to determine the type and trustworthiness of domains and their registrants. In other words, instead of a single factor, a combined value may be used. For example, when a domain is registered at a low price through a registrar known to have an insufficient abuse policy, and the services associated with the domain name are initiated within seconds of registration (or, by contrast, the services are idle for extremely long periods), this may be a signal of maleficence.

Usage: Proactive Registration of Domains Based on Attributes

Domains associated with certain attribute values may offer many types of utility. For example, cheap domain offerings may allow proactively registering domains from a DFA family. In another embodiment, cheap domains may allow systems that need domain name diversity to spread themselves out across a namespace at a utility cost. For example, if a system requires multiple domain names that are region-coded, then a base domain (e.g., "serviceA.<gTLD>") may geocode itself using cheap domains (e.g., like "asia-serviceZ.<gTLD>" or "Europe-serviceA.<gTLD>"). Such registration behavior may be automated by distributed systems when domain names reach a predetermined attribute level (e.g., a predetermined price).

Usage: Optimizing Domain Registrations

Given a fixed total price, a registrant may optimize the set of domains to register based on a variety of variables including, but not limited to, price, keywords, string length, TLD, Non-Existent Domain ("NXDomain") traffic levels, registration history, and the like. Using optimization algorithms, similar to the knapsack algorithm, a registrant may optimize the domains registered for the various variables weighted above. Back-modeling bulk registrations of domains may be accomplished to better understand a registrant's valued attributes and motivations.

Usage: Registration Timing Based on Forecasting of Domain Price

As the price decreases, the number of newly registered or re-registered domains increases. Based on pricing changes, inflation, and/or sales/discounts, domain registrations/renewals may be forecasted using regression modelling techniques.

Usage: Geo-Spatial Registration Price Optimization

When a distributed application encounters significant traffic in a certain region, it may be effective to register a new domain name at a TLD to sink local traffic. Certain attribute forecasting may make this more reasonable in predetermined areas at predetermined times. Conducting a cost-benefit tradeoff analysis based on domain pricing may allow applications and registrants to use geo-spatial loads and demand to determine whether or not to create geo-spatial domain registrations. In one example, DNS traffic from a particular country for specific domain names may exhibit a similar pattern. The pattern may be related to highly numerical-based domain names (e.g., 22348.com or 5862.com).

Figure 4:
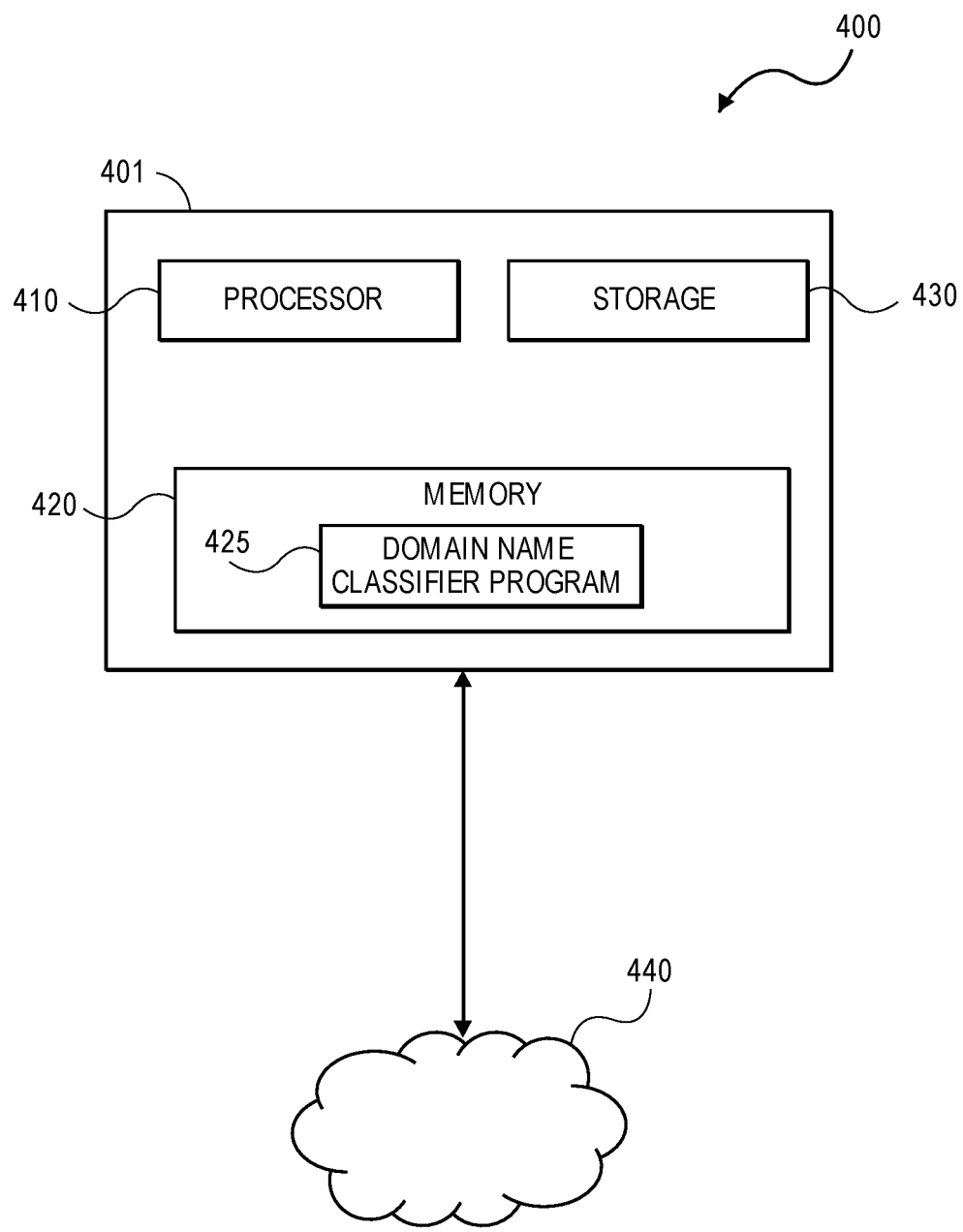
FIG. 4 is a diagram illustrating an example of a hardware system for performing at least a portion of one or more of the methods disclosed herein, consistent with certain disclosed embodiments.

FIG. 4 is a diagram illustrating an example of a hardware system 400 for performing at least a portion of one or more of the methods 200, 300 disclosed herein, consistent with certain disclosed embodiments. The example hardware system 400 includes example system components that may be used. The components and arrangement, however, may be varied.

The example hardware system 400 may include a computer 401. The computer 401 may include a processor 410, a memory 420, a storage 430, and input/output (I/O) devices (not pictured). The computer 401 may be implemented in various ways and can be configured to perform any of the embodiments described above. In some embodiments, the computer 401 can be a general purpose computer of an end user such as, for example, a desktop computer, a laptop, a tablet device, a mobile device (e.g., a smartphone), etc. In other embodiments, the computer 401 can be a computing device such as, for example, a data base server (e.g., a domain name registry), a web server, a mainframe computer, etc. The computer 401 may be standalone or may be part of a subsystem, which may, in turn, be part of a larger system. For example, the computer 401 can be at least a portion of the system 100 (e.g., the data collector 110, the data warehouse 120, the data classifier 130, or a combination thereof).

The processor 410 may include one or more known processing devices, such as a microprocessor from the Intel Core™ family manufactured by Intel™, the Phenom™ family manufactured by AMD™, or the like. The memory 420 may include one or more storage devices configured to store information and/or instructions used by the processor 410 to perform certain functions and operations related to the disclosed embodiments. The storage 430 may include a volatile or non-volatile, magnetic, semiconductor, tape, optical, removable, non-removable, or other type of computer-readable medium used as a storage device. In some embodiments, the storage 430 can include, for example, the data received by the data collector 110 and/or stored in the data warehouse 120.

In an embodiment, the memory 420 may include one or more programs or subprograms including instructions that may be loaded from the storage 430 or elsewhere that, when executed by the computer 401, perform various procedures, operations, or processes consistent with disclosed embodiments. For example, the memory 420 may include a domain name classifier program 425 for performing at least a portion of the method 200. The memory 420 may also include other programs that perform other functions, operations, and processes, such as programs that provide communication support, Internet access, etc. The domain name classifier program 425 may be embodied as a single program, or alternatively, may include multiple sub-programs that, when executed, operate together to perform the function of the domain name classifier program 425 according to disclosed embodiments.

The computer 401 may communicate over a link with a network 440 to, for example, the registry, the registrar, resolving clients, etc. For example, the link may be a direct communication link, a local area network (LAN), a wide area network (WAN), or other suitable connection. The network 440 may include the internet, as well as other networks, which may be connected to various systems and devices.

The computer 401 may include one or more input/output (I/O) devices (not pictured) that allow data to be received and/or transmitted by the computer 401. The I/O devices may also include one or more digital and/or analog communication I/O devices that allow the computer 401 to communicate with other machines and devices. The I/O devices may also include input devices such as a keyboard or a mouse, and may include output devices such as a display or a printer. The computer 401 may receive data from external machines and devices and output data to external machines and devices via I/O devices. The configuration and number of input and/or output devices incorporated in I/O devices may vary as appropriate for various embodiments. Example uses of the hardware system 400 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for detecting a domain name that is associated with malicious behavior, comprising:
  receiving domain data for a plurality of domain names comprising a first domain name and a plurality of similar domain names, wherein the plurality of similar domain names are previously determined to be associated with proper behavior, and wherein the plurality of similar domain names share a pattern with the first domain name, wherein the domain data comprises a first attribute and a second attribute of the first domain name and the similar domain names;
  comparing the first attribute of the first domain name to the first attributes of the similar domain names to produce a first value;
  comparing the second attribute of the first domain name to the second attributes of the similar domain names to produce a second value;
  combining the first value and the second value to produce a combined value;
  determining a likelihood that the first domain name is associated with malicious behavior based on the combined value; and
  performing a remedial action when the likelihood is greater than a predetermined value, wherein the remedial action is selected from the group consisting of: ceasing to process a request from the first domain name, sending an alert to a network operations controller that instigates reconfiguration of network hardware to block access by the first domain name to a server, setting up or reconfiguring a router or firewall rule to block a request from the first domain name, or a combination thereof.

2. The method of claim 1, wherein the domain data is received from a registry or a registrar.

3. The method of claim 2, wherein the first attribute is different at the registry and the registrar.

4. The method of claim 1, wherein the second attribute of the first domain name is selected from the group consisting of a use of the first domain name, a registration pattern of the first domain name, a query pattern of the first domain name, a reputation score of the first domain name, or a combination thereof.

5. The method of claim 1, further comprising:
  assigning a first weight to the first value to produce a first weighted value; and
  assigning a second weight to the second value to produce a second weighted value, wherein the first and second weights are selected based upon historical data of malicious behavior and benign behavior.

6. The method of claim 5, wherein combining the first value and the second value comprises combining the first weighted value and the second weighted value.

7. The method of claim 1, wherein combining the first value and the second value comprises using a logistic regression, a linear regression, or both to produce the combined value.

8. A system comprising:
  a processing system comprising one or more processors; and
  a memory system comprising one or more computer-readable media, wherein the one or more computer-readable media contain instructions that, when executed by the processing system, cause the processing system to perform operations comprising:
    receiving domain data for a plurality of domain names comprising a first domain name and a plurality of similar domain names, wherein the plurality of similar domain names are previously determined to not be associated with malicious behavior, and wherein the plurality of domain name share a pattern with the first domain name, wherein the domain data comprises a first attribute and a second attribute of the first domain name and the similar domain names;

comparing the first attribute of the first domain name to the first attributes of the similar domain names to produce a first value;

comparing the second attribute of the first domain name to the second attributes of the similar domain names to produce a second value;

combining the first value and the second value to produce a combined value;

determining a likelihood that the first domain name is associated with malicious behavior based on the combined value; and performing a remedial action when the likelihood is greater than a predetermined value, wherein the remedial action is selected from the group consisting of: ceasing to process a request from the first domain name, sending an alert to a network operations controller that instigates reconfiguration of network hardware to block access by the first domain name to a server, setting up or reconfiguring a router or firewall rule to block a request from the first domain name, or a combination thereof.

9. The system of claim 8, wherein the domain data is received from a registry or a registrar.

10. The system of claim 9, wherein the first attribute is different at the registry and the registrar.

11. The system of claim 8, wherein the second attribute of the first domain name is selected from the group consisting of a use of the first domain name, a registration pattern of the first domain name, a query pattern of the first domain name, a reputation score of the first domain name, and a combination thereof.

12. The system of claim 8, further comprising:
assigning a first weight to the first value to produce a first weighted value; and
assigning a second weight to the second value to produce a second weighted value, wherein the first and second weights are selected based upon historical data of malicious behavior and benign behavior.

13. The system of claim 8, wherein combining the first value and the second value comprises combining the first weighted value and the second weighted value.

14. The system of claim 8, wherein combining the first value and the second value comprises using logistic regression, a linear regression, or both to produce the combined value.

15. The system of claim 1, wherein the pattern comprises a linguistic pattern or a structural pattern.

* * * * *